Dec. 15, 1959   J. A. WINKER   2,917,254
BALLOON LAUNCHING DEVICE
Filed May 14, 1957

INVENTOR.
JAMES A. WINKER
BY
ATTORNEYS

United States Patent Office

2,917,254
Patented Dec. 15, 1959

2,917,254

BALLOON LAUNCHING DEVICE

James A. Winker, Sioux Falls, S. Dak., assignor to the United States of America as represented by the Secretary of the Air Force Application May 14, 1957, Serial No. 659,187

2 Claims. (Cl. 244—2)

(Granted under Title 35, U.S. Code (1952), sec. 266)

The invention described herein may be manufactured and used by or for the United States Government for governmental purposes without payment to me of any royalty thereon.

The present invention relates generally to improvements in launching devices and, as illustrated herein, relates more particularly to improvements in devices for launching a pre-inflated balloon from an airplane during flight.

It is frequently desirable to place a balloon at a particular spot at a particular time from an airplane, such as a balloon with a radar reflective coating in the eye of a hurricane so that the balloon, and the eye of the hurricane, can be tracked by radar, or for other purposes. It is difficult to launch an inflated balloon from an airplane in flight by hand since it may be caught or damaged by the fuselage or other parts of the plane.

Several methods and devices have been proposed to overcome this difficulty. Among them the installation of a longitudinal tube with an exit at the tail of the plane or a tube slanting down through the bomb bay with an exit under the plane, or the releasing of uninflated balloons with an inflating device attached which inflates the balloon after it is cast free.

While these methods of release have been moderately successful they are subject to the objection of considerable expense. In the use of a tube structural modification of the plane is usually required and, if the plane is to be returned to normal use, it must be removed, all at the cost of considerable time and money. Where uninflated balloons are used, the inflating devices cost many times that of pre-inflated balloons.

It is an object of this invention to overcome these objections by utilizing, with only minor changes, the releasing equipment already installed in all planes designed and equipped to carry and release packages or bombs, and without any structural alteration or time consuming changes and without using balloons equipped with self-inflating devices.

In the accompanying drawings.

Figure 1:
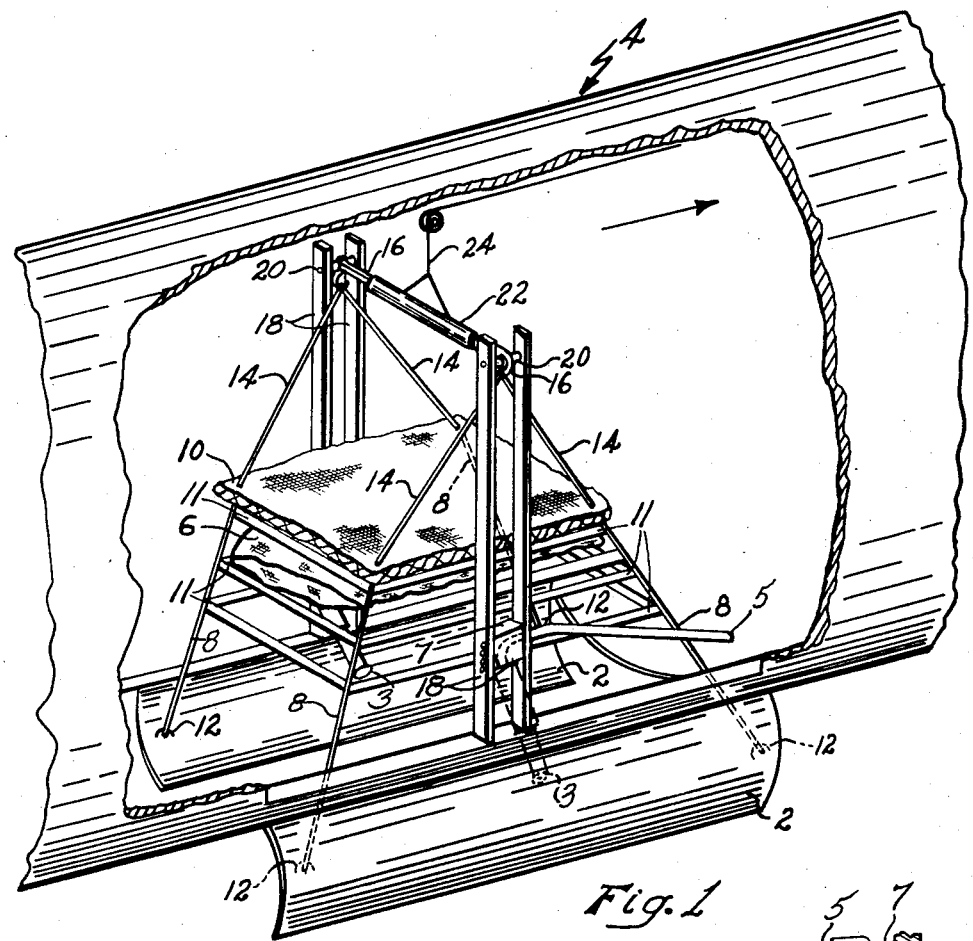
Fig. 1 shows a cutaway portion of the bomb bay of an airplane in which a preferred embodiment of this invention is incorporated.
Figure 2:
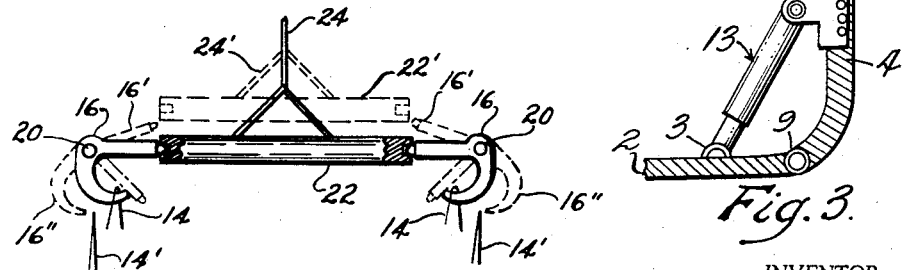
Fig. 2 is a fragmentary view of the releasing mechanism.
Figure 3:
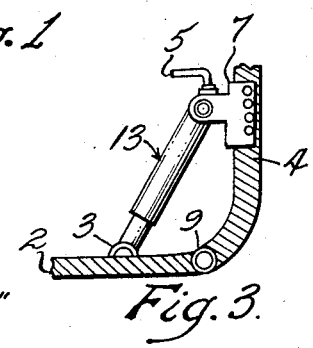
Fig. 3 is a view partly in section showing remote control door opening mechanism.

The present invention is shown and described herein as installed in an airplane of conventional design provided with downwardly opening doors 2 in the bottom portion of a fuselage 4. The doors 2 may be bomb doors of usual construction and may be opened and closed by a conventional remote control mechanism or by a hydraulic, pneumatic or electric mechanism 13, shown in Fig. 3 at the will of the bombardier or by any other conventional means. The plane, of course, may be used also for the delivery of packages of equipment or supplies to troops by discharging the same through the open doors 2. Accordingly, the plane may or may not be provided with conventional bomb release mechanism.

The present invention discloses a preferred embodiment wherein inflated balloons 6 may be projected through the opening formed by the open doors 2. The projecting mechanism as illustrated is in the form of a sling shot having elastic projection cords 8 and a suitable sling 10 which bears against the balloon 6 and forms with straps 11 a projection sac or pouch therefor.

The elastic projection cords or lines 8 are preferably formed of suitable rubber cord. The lines 8 are attached to the corner portions of the sac 10 in any suitable manner. For example, the cords or lines 8 may be inserted in suitable grommets located in the corner portions of the sac 10 and the end portions thereof suitably anchored to the sac 10. The free ends of the lines 8 are secured to the doors 2 by suitable means such as hooks 12 to cause the lines 8 to be placed under substantial tension when the doors 2 are opened as will hereinafter become apparent.

The sling or sac 10 is formed of any suitable material, although textile material of suitable strength such as heavy duck or canvas is preferred. The sling 10 is preferably of substantially the same size as the cross-sectional area of the ballon which is to be projected from the plane. Straps 11, of any suitable material, such as cloth webbing, are attached to lines 8 below the platform 10 to complete the enclosure or sac for holding the balloon. Other material such as relatively thin plywood or plastic sheets may also be used but a sac or sling formed of textile material is preferred since it may be packed and stored in a small space when not in use.

The projection device thus far described may be used in connection with a conventional bomb release mechanism or it may be used in connection with any suitable and simpler type such as that shown and described herein.

The sling 10 is provided with releasable anchoring lines 14 which are anchored to the sling 10 and are held by suitable releasing hooks 16 which, as illustrated, are each rotatably supported in the upper end portions of substantially vertically extending frames 18 which are suitably secured in position on opposite sides of the door opening. The anchoring lines 14 are of such length that the elastic projection lines 8 will be under sufficient tension when the doors 2 are opened to project the sling 10 and the balloon 6 or other object therein through the door opening a sufficient distance to prevent the downwardly projected balloon 6 from being caught or damaged by the fuselage or other parts of the plane. It is apparent that the present device is placed under proper tension by the act of opening the doors 2 by the remote door opening mechanism shown in Fig. 3.

The releasing hooks 16 are so arranged on their pivots 20 that they will swing in a direction to release the restraining or anchoring lines 14. A strut or cocking member 22 is interposed between the hooks 16 to maintain the hooks in a position which will support or maintain the device under tension. The strut 22 may be secured by a suitable releasing mechanism such as a line 24 which leads to a suitable location convenient to the pilot or other person responsible for launching the inflated balloon. The present releasing mechanism is merely illustrative since it is evident that the usual bomb release or other suitable mechanism can be used for this purpose.

Having thus described my invention, what I claim as new and desire to secure by Letters Patent of the United States is:

1. A launching device comprising an aircraft having a compartment with outwardly opening doors, a carrier in said compartment for engaging an object to be launched, releasing means fixed to said aircraft, elastic means attached to said release means and to said doors and said carrier, means for moving said doors to open position thereby tensioning said elastic means, means for operating said release means for disconnecting said elastic means therefrom to permit said elastic means to propel the object engaged with said carrier through said doors.

2. A launching device comprising an aircraft having a compartment with outwardly opening doors, a carrier in said compartment engaging an inflated balloon, elastic means attached to said carrier and to the doors, means for moving said doors to open position thereby tensioning said elastic means, means fixed on said aircraft for releasably maintaining said tension on said elastic means to hold said carrier in a cocked position, and means for releasing the maintaining means to permit said elastic means to propel said balloon through said doors.

References Cited in the file of this patent
UNITED STATES PATENTS

| | | |
|---|---|---|
| 2,500,809 | Fennessy et al. | Mar. 14, 1950 |
| 2,778,332 | Talbot | Jan. 22, 1957 |
| 2,778,587 | Moran | Jan. 22, 1957 |